Figure 1:
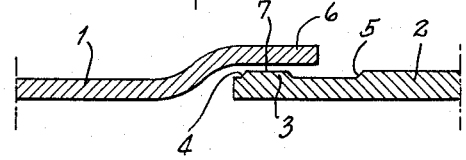

Jan. 14, 1964   C. GROS ETAL   3,118,049
METAL WELDING
Filed Sept. 20, 1961

INVENTORS
CHARLES GROS
BY RAYMOND VALLIER
ATTORNEYS

United States Patent Office 3,118,049
Patented Jan. 14, 1964

3,118,049
METAL WELDING
Charles Gros, La Tronche, Isere, and Raymond Vallier, St. Martin-le-Vinoux, Isere, France, assignors to Societe a responsabilite Limitee Helicotule, Saint-Egreve, France, a corporation of France
Filed Sept. 20, 1961, Ser. No. 139,552
9 Claims. (Cl. 219—93)

This invention relates to metal welding and more particularly to the welding of metal items by the use of high frequency electric current.

The conventional type of welding process in which high-frequency current is employed has a wide variety of practical applications. It can be utilized, for example, in such diverse applications as welding large flat steel sheet sections, or welding spiral aluminum sheeting to form a helical pipe. In the conventional practice of this type of welding, the work is fed through welding machines of known construction at a rate of feed determined by the cross-sectional area of the weld to be made on the particular work. There are no major difficulties involved in such practice where the work is readily adaptable to the production of a uniform weld. Thus, in the butt welding of metal sheeting, where the cross-sectional area of the weld depends on the plate thickness, the thickness of the edge of such sheeting to be welded is usually substantially constant over the entire sheet. With such a condition, the weld cross-section will automatically be constant throughout the length of the sheet, and the work feed rate therefore will also be constant. Where, however, the weld is of such nature that there is apt to occur a variance in the cross-sectional area of the weld, as in the case of lap welding because of the possibility of substantial variance in the width of the overlap, it is necessary that the feed rate of the work be varied to compensate for the contact area variations in order that there will be maintained the proper relationship between weld cross-section and work feed rate. To provide such variances in the work feed rate it is necessary that the welding machine be provided with rather complicated drive systems which are costly to install and increase the cost of operating the machine.

It is the principal purpose of the present invention to provide an improved method of maintaining the weld area constant even in lap welding operating operations and thereby avoid the necessity of adjusting welding machine feed rates and the complicated drive systems such adjustments usually require.

In accordance with the invention, the foregoing purpose is attained by interposing between the sheets to be welded together, an offset welding surface which extends along the line of weld and forms the contact surface between the two sheets and which is of constant width throughout its length and therefore is of constant cross-sectional area. As such an offset surface will effect a weld of constant cross-section regardless of the variance in the widths of the sheet portions being welded together, such as the width of overlap in lap welding metal plates, a very satisfactory weld can be achieved at a constant rate of feed of the work without regard to such variance. The offset welding surface may be provided on one of the metal sheets in any suitable manner as by deforming the sheet, or it may be produced by interposing between the two sheets a metal strip of given width.

Figure 2:
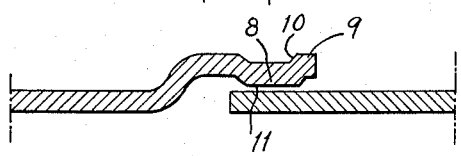
Figure 3:
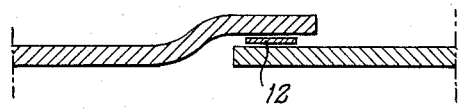

A better understanding of the invention will be obtained from a perusal of the following description when read in connection with the accompanying drawing which shows for the purposes of illustration several applications of the invention in the lap welding of metal sheets and in which FIG. 1 is a cross-sectional view of overlapped portions of two metal sheets in the formation of a lap weld in accordance with the invention by providing the outside surface of one of the plates with the offset welding surface;

FIG. 2 is a similar view showing the manner in which the invention may be carried out by providing the offset welding surface on the inside surface of one of the metal sheets; and FIG. 3 is a similar view illustrating how the invention may be practiced by establishing the contact zone between the two sheets by means of a metal strip.

In the drawings, the reference numerals 1 and 2 indicate generally two metal sheets shown positioned for lap-welding by means of a high-frequency current. It will be understood that in the carrying out of this operation the two sheets are fed in the customary manner through a welding machine of known construction to progressively produce the weld through the use of high frequency electric current. The machine need only be provided with a simple drive system to feed the work therethrough at a constant rate of feed for the invention renders it wholly unnecessary to provide the machine with a drive capable of producing varying feed rates to take care of variations in the cross-sectional area of the weld as the work is being advanced.

One of the sheets shown in FIG. 1 of the drawings, has been provided with a raised projection 3 which extends along the edge portion thereof within the overlapping area of the two sheets. The projection 3 illustrated may be produced by deforming the metal of the sheet with the welding machine drive rollers so that a groove 4 is provided along the edge of the outside surface of such sheet and a groove 5 is provided in such outside surface spaced inwardly from such edge. The groove 5 is of sufficient width so that in cross-section it extends beyond the outer edge of the bent overlapping edge portion 6 of the sheet 1 and therefore beyond the overlapping area of the two sheets. The two grooves 4 and 5 may be of only a few tenths of a millimeter in depth; just sufficient so that the exterior surface 7 of projection 3 will be raised with relation to the outside surfaces of the overlapped area of sheet 2, although it is on the same level as the remaining outside surface of such sheet.

The two grooves 4 and 5 form a projection 3, the outside surface 7 of which has a constant width throughout the entire length of the projection 3. As it will be evident from FIG. 1 that it is this outside surface 7 which will form the contact surface of sheet 2 with the surface of the bent portion 6 of sheet 1, there will be assured a constant weld cross-section along the full length of the sheet. Consequently, the feed rates for both sheets in the welding machine can be kept constant.

The projection 3 may be provided on the sheet 2 in any other manner known to the art, as by a stamping operation, and may be formed on such sheet so that the exterior surface 7 thereof is located in a plane offset from the plane of the normal outside surface of the sheet, as is indicated in the construction shown in FIG. 2 of the drawings.

The projection 8 in the construction shown in FIG. 2 is provided on the inside surface of the overlapping sheet edge portion 9 and is effected by deforming such edge portion so that the projection is pressed out of the material of the metal sheet. Thus, as the projection 8 is formed there is simultaneously formed a groove 10 on the other side of edge portion 9. As a result of this construction, the outer or contacting surface 11 of the projection 8 is offset from the adjacent normal surfaces of the sheet a sufficient distance to form a constant weld cross-section with the opposed surface portion of the other metal sheet without such adjacent normal surfaces becoming part of the weld.

As has been above indicated, the purposes of the invention may be accomplished also by interposing a strip of metal between the overlapped portions of the two metal sheets instead of deforming the metal sheets as shown in FIGS. 1 and 2 of the drawings. The use of such a strip is shown in FIG. 3 wherein the strip is designated by the numeral 12. The strip 12 is relatively thin, about a few tenths of a millimeter, and has a given uniform width throughout its length. The strip 12 may be in separate condition from the two metal sheets as the work is fed to the welding station in the machine and simultaneously united to the overlapped portions of both sheets as the welding operation progresses. In such a situation each side surface of the strip 12 will function as an offset welding surface to that metal sheet with which it is in contact. The strip 12 may also be previously welded to either of the metal sheets to be united in which case it would function in the manner of the projections 3 and 8 in the final welding operation.

The strip 12 has the further advantage in that it makes it possible to weld together two metal sheets which are not readily weldable together because they are constituted of different metals or because they are made of a metal that is not readily weldable to itself. In such a situation the strip 12 should be made of a different metal that is readily weldable to the metal or metals of which the sheets are composed. The strip 12 may also be made of different metal than the metals of the sheets to be welded for other reasons and depending upon the prospective use of the welded sheets.

While we have described and illustrated several preferred embodiments of our invention, it will be apparent to those skilled in the art that other modifications thereof may be made without departing from the spirit of the invention or the scope of the appended claims.

We claim:

1. A manufacture composed of two metal members welded together by means of a high frequency electric current, the weld being formed by progressively joining two opposed elongated portions of said members along a continuous line of weld extending the entire joined length of such portions, the surface of one of said member portions welded to the other of said member portions being plane and having an area comparable to the opposed area of said other member portion, said surface being joined to said other member portion by an offset contact surface constituting a projection of the opposed surface of said other member portion so that the relatively set back sections of such opposed surface adjacent thereto do not form part of the weld at said offset surface, said offset surface being plane and of a width greater than the thickness of said other member portion, but substantially less than the width of said plane surface of said one member portion, and being located within the longitudinal confines of the latter, and said offset surface having a length as great as the length of the line of weld and being continuous and of constant cross-sectional area throughout its length, whereby said opposed elongated member portions are joined solely within a continuous longitudinal strip of constant cross-sectional area less than the cross-sectional area defined by said opposed member portions.

2. A manufacture such as defined in claim 1 in which said metal members are metal sheets lap-welded together, the opposed elongated portions of said sheets being the overlapping edge portions thereof forming said weld, and in which one of said overlapped portions is formed to provide an elongated projection extending continuously longitudinally along such portion within the overlapping area and disposed between said overlapped edge portions in spaced relation to the outer side edges of both of the latter, said projection being formed to provide an outer surface disposed outwardly from adjacent longitudinally extending surface sections forming part of the cross-sectional area of said one overlapped portion and constituting said offset contact surface.

3. A manufacture such as defined in claim 1, in which said metal members are metal sheets lap-welded together, the opposed elongated portions of said sheets being the overlapping edge portions thereof forming said weld, and in which said offset contact surface is formed by one side face of a thin metal strip of uniform width interposed between said overlapped edge portions within the overlapping area thereof and in spaced relation to the outer side edges of both of the latter, said one side face of said metal strip constituting said offset contact surface being disposed outwardly from adjacent longitudinally extending surface sections forming part of the cross-sectional area of one of said overlapping edge portions and the other side face of said metal strip being joined directly to an opposed longitudinally extending surface section of said one overlapping edge portion located intermediate said adjacent surface sections thereof.

4. A method of welding two metal members together by progressive application of a high frequency electric current while said members are being advanced past a welding station to form a continuous line of weld between such members, which comprises providing between associated elongated portions of said members to be joined together, an offset contact surface constituting a projecting portion of the oppositely disposed surface of one of such elongated portions so that the relatively set back sections of such opposed surface adjacent thereto do not become part of the weld, and which opposes the contact surface of the other of such elongated portions to which said one elongated portion is to be welded, said offset contact surface being made plane and being provided with a width greater than the thickness of said one elongated portion, but less than said opposing contact surface of said other of such elongated portions, and being made continuous and with a constant cross-sectional area throughout its length, and then progressively welding said offset contact surface to said opposing contact surface at a given constant rate of feed to join said elongated portions solely within a continuous longitudinal strip of constant cross-sectional area defined by said contact surfaces.

5. A method such as defined in claim 4 in which said offset contact surface is provided on the outer end of an elongated projection having a continuous length as great as the line of weld and formed on the elongated portion of one of said members so that it projects outwardly from remaining portions of the surface of such elongated portion opposing the contact surface of the other of such elongated portions, and so that it is spaced from the outer side edges of both of said elongated portions.

6. A method such as defined in claim 5 in which said elongated projection is progressively formed as said members are being fed past the welding station at said given constant rate of feed.

7. A method such as defined in claim 4 is which said offset contact surface is provided by interposing a thin metal strip between the associated elongated portions of said members.

8. A method such as defined in claim 7 in which said interposed strip is simultaneously welded to both of the associated elongated portions of said members as the latter are being fed past the welding station at said given constant rate of feed.

9. A method such as defined in claim 4, in which said offset contact surface is provided by interposing between the associated elongated portions of said members, a thin metal strip constituted of a metal different from the metal of which at least one of said elements is composed.

References Cited in the file of this patent

UNITED STATES PATENTS

| | | |
|---|---|---|
| Re. 21,495 | Short | June 25, 1940 |
| 690,958 | Hunter | Jan. 14, 1902 |
| 1,367,552 | Kischlighter | Feb. 8, 1921 |
| 1,822,197 | Bowlus | Sept. 8, 1931 |